United States Patent [19]

Jernow et al.

[11] 3,862,180

[45] Jan. 21, 1975

[54] 2H-1,4-BENZOXAZIN-3(4H)-ONES

[75] Inventors: Jane Liu Jernow, Verona; Perry Rosen, North Caldwell, both of N.J.

[73] Assignee: Hoffmann-La Roche Inc., Nutley, N.J.

[22] Filed: May 31, 1973

[21] Appl. No.: 365,663

[52] U.S. Cl.......... 260/242, 260/244 R, 260/471 R, 424/245, 424/248
[51] Int. Cl............................................. C07d 87/32
[58] Field of Search........................... 260/244, 242

[56] References Cited
OTHER PUBLICATIONS

Chkanikov et al., Chem. Abstracts, Vol. 75, Item 106152, (1971).

Hofman et al., I, Chem. Abstracts, Vol. 70, Item 84939u (1969).

Hofman et al., II, Chem. Abstracts, Vol. 73, Item 120861, (1970).

*Primary Examiner*—Harry I. Moatz
*Attorney, Agent, or Firm*—Samuel L. Welt; Bernard S. Leon; Frank P. Hoffman

[57] ABSTRACT

A process for the preparation of hydroxamic acids and novel 1,4-benzoxazin-3-ones prepared by this process are disclosed. The resulting hydroxamic acids, including the novel 1,4-benzoxazin-3-ones, exhibit insecticidal activity.

12 Claims, No Drawings

2H-1,4-BENZOXAZIN-3(4H)-ONES

DESCRIPTION OF THE INVENTION

The present invention relates to a process for preparing compounds of agrobiological value and to novel intermediates and end products resulting from this process. More particularly, the present invention relates to a process for the preparation of cyclic hydroxamic acids. A number of naturally occurring hydroxamic acids, such as aspergillic acid, 2,4-dihydroxy-1,4-benzoxazin-3(4H)-one (DIBOA) and 2,4-dihydroxy-7-methoxy-2H-1,4-benzoxazin-3(4H)-one (DIMBOA) have been isolated and have shown antibacterial, insecticidal and anti-fingal activity. The variety of activities displayed by DIBOA and DIMBOA have been the subject of many publications. Representative of these are: Virtanen et al., *O. Suomen. Kemistilehti B*, 32, 252 (1959); Wahlroos et al., *Acta. Chem. Scand.*, 13, 1906 (1959); and Virtanen, *Angew. Chem. International Edit.*, 1, 299 (1962).

The unavailability of a synthetic approach to many of these compounds has precluded extensive investigations with these valuable materials. The present invention provides, for the first time, an efficient synthesis of one class of these naturally occurring hydroxamic acids, namely the 1,4-benzoxazin-3-ones, of which DIBOA and DIMBOA are representatives.

The 1,4-benzoxazin-3-one derivatives prepared by the present process can be depicted by the following general formula:

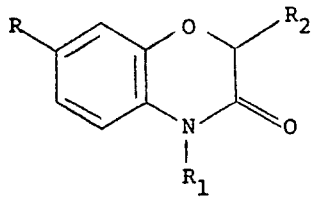

I wherein R is selected from the group consisting of hydrogen, halogen, lower alkoxy, lower alkyl, and aryl; $R_1$ signifies hydroxy, lower alkoxy or benzyloxy; $R_2$ signifies hydroxy, lower alkoxy or a protected glucoside and, when $R_1$ signifies hydroxy, the salts thereof with transition metals.

As used throughout this disclosure, the term "halogen" denotes chlorine, fluorine and bromine unless otherwise specified. The term "lower alkyl" includes straight and branched chain hydrocarbon groups having from 1-7, preferably from 1-4, carbon atoms, including, for example, methyl, ethyl, propyl, isopropyl, butyl and the like. The term "aryl" denotes an organic radical derived from an aromatic hydrocarbon by the removal of a hydrogen atom, such as, for example, phenyl, tolyl and the like. The term "lower alkoxy" denotes O-lower alkyl groups wherein the lower alkyl moiety is as defined above. Suitable protecting groups that can be employed in preparing the protected glucoside include lower alkyl groups such as a methyl group, acyl groups, such as an acetyl or propionyl group, or a benzyl group.

The process of the present invention results in the preparation of many hydroxamic acids, including, of particular interest, many heretofore unknown 1,4-benzoxazin-3-ones. Among the preferred novel 1,4-benzoxazin-3-ones prepared according to this invention are those bearing a hydrogen, lower alkoxy or halogen group in the 7-position. Another preferred group of novel 1,4-benzoxazin-3-ones prepared following the inventive procedure includes compounds bearing a lower alkoxy group in the 2- and 4-positions. Of particular interest among the novel compounds of this invention are benzoxazine derivatives of the formula:

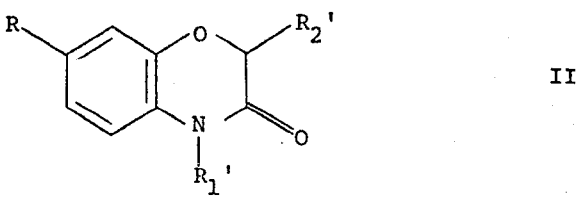

II wherein R is as described above; $R_1'$ signifies hydroxy, lower alkoxy or benzyloxy; $R_2'$ signifies hydroxy, lower alkoxy or a protected glucoside, with the proviso that if R signifies hydrogen or lower alkoxy, at least one of $R_1'$ and $R_2'$ is other than hydroxy and, when $R_1'$ signifies hydroxy, the salts thereof with transition metals.

A preferred class of compounds falling within the scope of formula II above are those wherein R signifies hydrogen, halogen, preferably chlorine, or lower alkoxy, preferably methoxy, and $R_1'$ and $R_2'$ signify lower alkoxy, i.e., compounds of the formula:

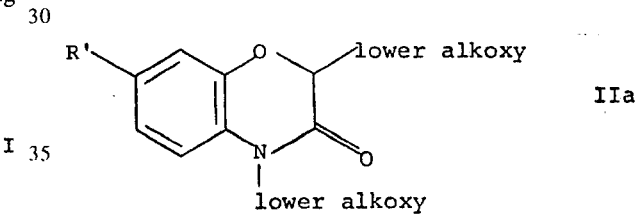

IIa wherein R' signifies hydrogen, halogen or lower alkoxy.

Most preferred of the compounds of formula II above are:
4-hydroxy-2-methoxy-2H-1,4-benzoxazin-3(4H)-one;
4-hydroxy-2,7-dimethoxy-2H-1,4-benzoxazin-3(4H)-one;
7-chloro-4-hydroxy-2-methoxy-2H-1,4-benzoxazin-3(4H)-one;
2,4-dimethoxy-2H-1,4-benzoxazin-3(4H)-one;
2,4,7-trimethoxy-2H-1,4-benzoxazin-3(4H)-one; and
7-chloro-2,4-dimethoxy-2H-1,4-benzoxazin-3(4H)-one.

When the substituent in the 4-position is a hydroxy group, the compounds of formula I above, including the novel 1,4-benzoxazin-3-ones of formula II, form salts with transition metals. Suitable transition metals for this purpose include di- and tri-valent metals such as copper, zinc, cobalt, iron, magnesium and the like.

The compounds of formula I above and the preferred novel 1,4-benzoxazines of formula II above can be prepared following a variety of synthetic routes, including the novel process aspect which forms a part of the present invention.

In following the aforementioned novel process aspect of this invention, the compounds of formula I above may be prepared by reacting an appropriately substituted o-nitrophenol of the formula:

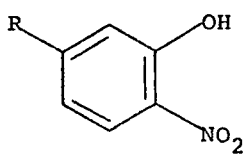

wherein R is as described above
with a lower alkyl α-halo-α-lower alkoxy acetate of the formula

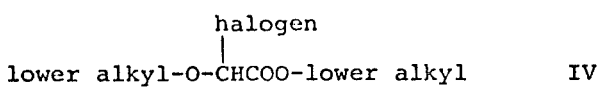

This reaction results in the preparation of a compound of the formula

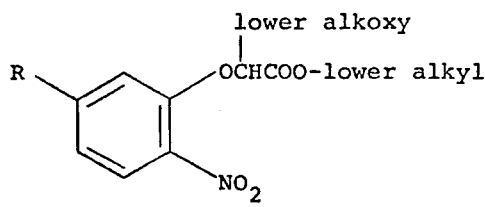

wherein R is as described above.

The halogen substituent in the compounds of formula IV is preferably chlorine or bromine, most preferably bromine.

In the reaction between the compounds of formulae III and IV, it is expedient to first prepare the alkali metal salt or the thallium salt of the phenol of formula III. This can be accomplished, for example, by reacting the phenol with an alkali metal alkoxide such as sodium methoxide or potassium t-butoxide, an alkali metal hydride such as sodium hydride, or a thallium alkoxide, such as thallium ethoxide. The reaction leading to the compound of formula V is preferably carried out in the presence of an inert organic solvent. Suitable solvents include aromatic hydrocarbons such as benzene, aliphatic hydrocarbons such as pentane and petroleum ether, and ethers, such as diethyl ether.

Temperature and pressure are not critical to this reaction and thus the reaction is conveniently effected at room temperature and at atmospheric pressure.

The so-obtained compound of formula V is then reduced using a select reduction system to form the hydroxylamine intermediate which, under the reaction conditions employed, cyclizes spontaneously in situ. The reducing system employed for the reduction of the formula V compound consists of zinc dust in aqueous ethanolic ammonia chloride. This reaction is expediently effected at room temperature and atmospheric pressure.

The hydroxylamine intermediate formed, but which need not be isolated, can be depicted by the following general formula:

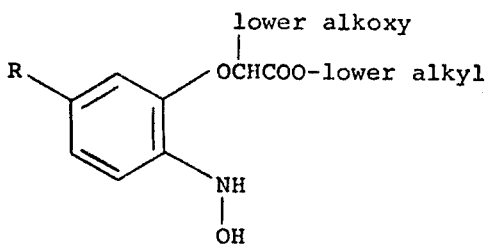

wherein R is as described above.

As indicated above, the hydroxylamine of formula VI cyclizes spontaneously under the reaction conditions employed to yield the zinc salt of the 2-lower alkoxy-1,4-benzoxazin-3-one of the formula

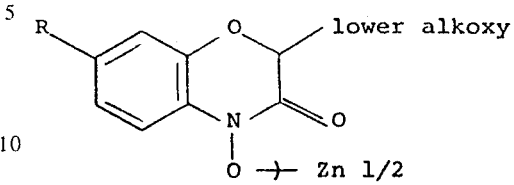

wherein R is as described above.

If desired, the compounds of formula Ia above can be converted into the corresponding compound of formula I wherein $R_1$ signifies hydroxy. This 4-hydroxy derivative of the formula

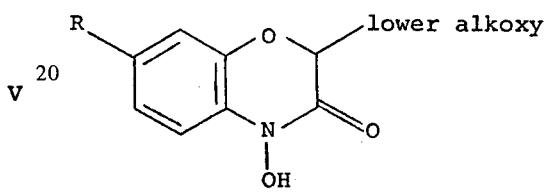

wherein R is as described above is prepared by hydrolyzing the zinc salt of formula Ia. Such hydrolysis can be effected following standard procedures. For example, the compound of formula Ia can be treated with a mineral acid, such as hydrochloric acid, sulfuric acid, and the like to effect hydrolysis of the salt, or the zinc salt can be treated with a cation exchange resin, such as a Dowex ($H^+$) resin, to effect hydrolysis.

In an alternate synthetic approach, the compounds of formula Ib above can be prepared directly from the corresponding compound of formula VI via the reductive cyclization of this open intermediate. This reductive cyclization is effected by treating the formula VI compound with sodium borohydride. This reaction is preferably effected using aqueous dioxane as the solvent.

The zinc salt of formula Ia can also be used to prepare other compounds of formula I. For example, the zinc salt can be converted to another transition metal salt, such as the copper salt, by a simple metal exchange reaction. This metal exchange can be effected by treating the formula Ia compound with a salt of the desired transition metal such as cupric acetate, cupric sulfate and the like. This reaction is preferably effected in the presence of an inert organic solvent such as aqueous alcohol and is conveniently carried out at room temperature.

Further, if desired, the zinc salt of formula Ia can be converted to the corresponding compound of formula I wherein $R_1$ signifies lower alkoxy, i.e., to a compound of the formula:

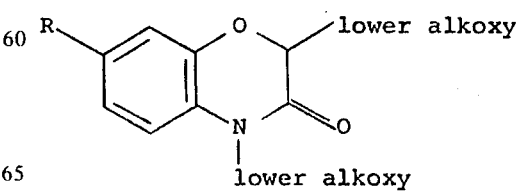

wherein R is as described above.

This conversion can be effected by treating the formula I*a* compound with a conventional alkylating agent. Suitable alkylating agents for this purpose include alkyl halides such as methyl iodide, ethyl bromide and the like, and dialkyl sulfates, such as dimethylsulfate. The alkylation reaction is preferably carried out in the presence of an inert organic solvent such as tetrahydrofuran, petroleum ether and the like. The reaction can be effected at a temperature between room temperature and the reflux temperature of the reaction mixture, with reflux temperature being preferred.

In an alternate synthetic approach, the 4-hydroxy-1,4-benzoxazin-3-ones of formula I*b* can be converted to the corresponding transition metal salt, such as the copper salt by treating said compound with a salt of the desired transition metal, for example cupric acetate, magnesium acetate, and the like. This reaction is expediently effected at room temperature and in the presence of an inert organic solvent such as an aqueous alcohol, i.e., aqueous methanol, aqueous ethanol, aqueous propanol and the like.

In another alternate process aspect, the 2,4-dialkoxy compounds of formula I*c* can be prepared by alkylating the 4-hydroxy derivative of formula I*b*. In this alkylation reaction, it is expedient to first prepare the alkali metal or thallium salt of the formula I*b* compound. This can be done by treating said compound with an alkali metal alkoxide, such as sodium methoxide or potassium t-butoxide or a thallium alkoxide such as thallium ethoxide. The so-obtained salt is then treated with a conventional alkylating agent such as an alkyl halide or dialkyl sulfate to yield a desired 2,4-dialkoxy derivative. This alkylation reaction is expediently effected at room temperature and in the presence of an inert organic solvent such as tetrahydrofuran or pentane.

If, in the compounds of formula I*b* above, the lower alkoxy group in the 2-position is a methoxy group, this methoxy group can be cleaved to yield the corresponding compound of formula I wherein $R_2$ represents hydroxy, i.e., a compound of the formula

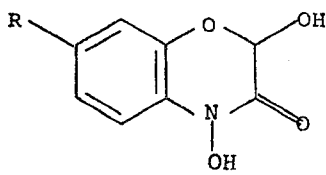

I*d* wherein R is as described above.

The ether cleavage of the compound of the formula I*b* to yield the desired compound of formula I*d* can be accomplished by treating said compound with a reagent used to cleave methyl ethers. Suitable reagents for this purpose include Lewis acids such as boron trichloride and boron tribromide. This methyl cleavage reaction is expediently effected in the presence of an inert organic solvent, preferably a halogenated hydrocarbon such as methylene chloride, chloroform, and the like. The demethylation reaction is carried out using temperatures in the range of from about −80° to about 0°C.

In an alternate synthetic approach to the compounds of formula I above, including the novel 1,4-benzoxazin-3-ones of formula II, the 2-unsubstituted-4-lower alkoxy-1,4-benzoxazin-3-ones of the formula:

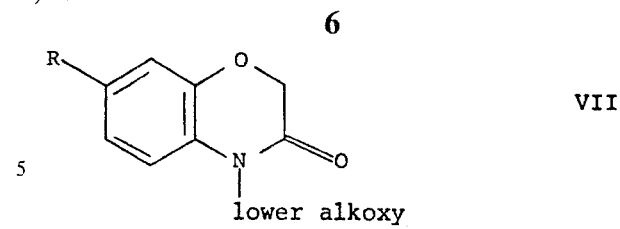

VII wherein R is as described above
can be employed as the starting materials.

In this alternate process aspect, the compound of formula VII above is chlorinated or brominated in the 2-position to yield a compound of the formula

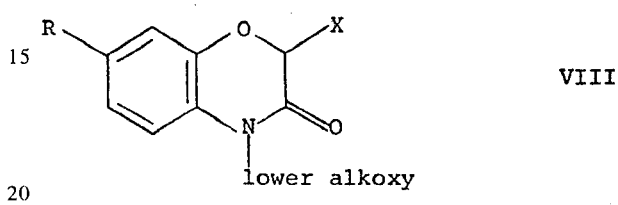

VIII wherein R is as described above and
X signifies chlorine or bromine.

Suitable brominating agents for the purposes of this process aspect include N-bromosuccinamide (NBS) and bromine, while n-chlorosuccinamide (NCS) can be used as the chlorinating agent. The bromination or chlorination reaction is preferably effected in the presence of an inert organic solvent. Suitable solvents for this purpose include halogenated hydrocarbons such as chloroform and carbon tetrachloride, ethers such as diethyl ether, aromatic hydrocarbons such as benzene and toluene and aliphatic hydrocarbons such as pentane, hexane, heptane and petroleum ether. It is preferred to effect this reaction at elevated temperature, with the reflux temperature of the reaction mixture being most preferred.

The compound of formula VIII above can then be converted to the corresponding compound of formula I wherein $R_1$ signifies lower alkoxy and $R_2$ signifies lower alkoxy, hydroxy or a protected glucoside, i.e., a compound of the formula

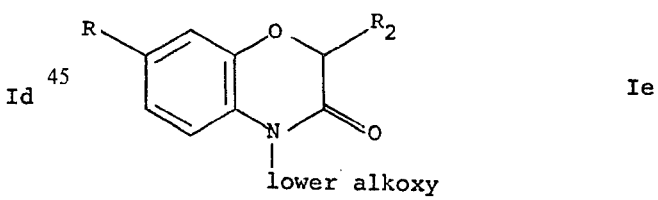

I*e* wherein R and $R_2$ are as described above.

If it is desired to prepare a compound of formula I*e* wherein $R_2$ signifies lower alkoxy, the compound of formula VIII is treated with an aliphatic alcohol such as methanol, ethanol, propanol and the like in the presence of a reagent, such as silver nitrate, that will activate the 2-chloro or 2-bromo substituent. It is expedient to carry out this reaction at room temperature; the aliphatic alcohol reagent also serves as the solvent for the reaction.

Alternatively, the compound of formula I*e* wherein $R_2$ signifies lower alkoxy can be prepared by treating the formula VIII compound with an alkali metal alkoxide or a thallium alkoxide in the presence of the corresponding aliphatic alcohol. Suitable reagent systems for the purpose include sodium methoxide in methanol, potassium ethoxide in ethanol and thallium ethoxide in ethanol. This reaction is expediently effected at room temperature.

If the compound of formula Ie wherein $R_2$ signifies hydroxy is desired, the formula VIII compound can be treated with water in the presence of silver nitrate. If it is desired to obtain the compound of formula Ie wherein $R_2$ signifies a protected glucoside group, the formula VIII compound is treated with a protected glucose derivative, for example β-D-glucose-2,3,4,6-tetraacetate. This reaction is effected in the presence of a reagent, such as silver carbonate, that will activate the 2-chloro or 2-bromo substituent. It is expedient to carry out this reaction at room temperature and in the presence of an inert organic solvent such as a halogenated hydrocarbon, for example, methylene chloride.

The compound of formula VIII can also be used to prepare the corresponding compound of formula I wherein $R_1$ signifies hydroxy and $R_2$ signifies hydroxy or lower alkoxy. If it is desired that $R_2$ signify hydroxy, the formula VIII compound can be treated with boron trichloride or boron tribromide in the presence of a halogenated hydrocarbon such as methylene chloride or chloroform. The resulting complex is then treated with water to yield the compound of formula Id. If it is desired to prepare a compound wherein $R_2$ signifies lower alkoxy, the complex resulting from the boron tribromide or boron trichloride treatment of the formula VIII compound is then treated with an aliphatic alcohol such as methanol, ethanol, propanol and the like to yield the desired product.

The novel compounds of formula II above, as well as the salts thereof with transition metals, exhibit insecticide activity. Such insecticide activity can be seen, for example, when representative compounds of the present invention are tested against plant feeding insects. This testing is carried out by transplanting the test plants into 50 grams of soil (2:1, loam:sand). The soil mix surface is then drenched with 20 ml. of the test compound and then covered with an additional 50 grams of the loam:sand mixture to effect a treatment rate of 50 parts per million on the soil. Twenty-four hours and 4 days after treatment, leaves were detached, placed in petri dishes on moistened filter paper, infested with 5 day old larvae of tobacco bud worm (*Heliothis virescens*) and held for observation. In this systemic drench treatment, 7-chloro-2,4-dimethoxy-2H-1,4-benzoxazin-3(4H)-one, a representative compound of the present invention, caused a 70% reduction in feeding by the larvae at 50 ppm, indicating that this compound is active as an insecticide.

The insecticide activity of the compounds of formula II above can also be demonstrated by using artificial diet testing techniques. In such testing, the artificial diet preparation is prepared as follows:
Ingredients:
  75 gm. lima beans
  75 gm. wheat germ
  30 gm. brewers yeast
  3 gm. ascorbic acid
  3 gm. Methyl parabenzoate
  420 ml. $H_2O$
  1 ml. Formaldehyde
The above ingredients are blended in a blender for 3 minutes, 2 minutes at slow speed and 1 minute at fast speed, then poured into a large beaker.
Next, separately blend:
  12.6 gm. agar
  500 ml. $H_2O$ (boiling)
in blender for 3 minutes as above. Add mixture from beaker to blended agar and blend for 3 minutes as above.

Three grams of the artificial diet, prepared as described above, are then thoroughly mixed with the test compounds in a one ounce plastic cup which in turn becomes an individual test unit. Three such individual cups (replicates) are utilized for each test rate. Each replicate was infested with 20 newly hatching larvae of the test insect, which would be Southern army worm larvae (*Spodoptera eridania*) or European corn borer larvae (*Ostrinia nubilalis*). The cups were then covered with a perforated cap and observed for mortality after 4 and 8 days of exposure to the treatment. Five larvae were selected from each replicate containing survivors and these same were transferred to the untreated diet. As these larvae developed, they were again transferred to pupate in individual containers. Observations were made for average number of days to pupation and for percent adult emergence. In the initial observations, in addition to observing the mortality rate, the rate of feeding retardation was also observed.

Following the above described artificial diet testing techniques, representative compounds of the present invention showed the following results:

I. 7-chloro-2,4-dimethoxy-2H-1,4-benzoxazin-3(4H)-one (Compound A) in the artificial diet brought about a 50% reduction in feeding at 500 ppm. with Southern army worm larvae. The growth retardation of European corn borer larvae exposed to the artificial diet impregnated with Compound A at 1,000, 300 and 100 ppm. was 90, 80 and 50% respectively. The mortality rate of European corn borer using Compound A in the artificial diet was 37% at 300 ppm. and 77% at 1,000 ppm.

II. 2,4,7-trimethoxy-2H-1,4-benzoxazin-3(4H)-one (Compound B) in the artificial diet brought about a 75% reduction in feeding at 500 ppm. with Southern army worm larvae. The growth retardation of Southern army worm larvae exposed to the artificial diet impregnated with Compound B at 4,500, 1,500 and 500 ppm. was 90, 85 and 70% respectively. The mortality rate of Southern army worm larvae using Compound B in the artificial diet was 48% at 4,500 ppm.

III. 2,4-dimethoxy-2H-1,4-benzoxazin-3(4H)-one (Compound C) in the artificial diet with Southern army worm larvae at 500, 1,500 and 4,500 ppm. brought about a 10, 85 and 100% reduction in feeding respectively. The growth retardation of Southern army worm larvae exposed to the artificial diet impregnated with Compound C at 4,500, 1,500 and 500 ppm was 100, 85 and 10% respectively. The mortality rate of Southern army worm larvae using Compound C in the artificial diet was 100% at 4,500 ppm. At 100 ppm of Compound C, the reduction in adult emergence was 45%. At 1,000 ppm., the reduction in egg hatch using Compound C is 90%.

The following examples are illustrative and not limitative of the present invention. All temperatures are given in degrees Centigrade.

EXAMPLE 1

Preparation of
2-Bromo-4-methoxy-2H-1,4-benzoxazin-3(4H)-one

To a stirred solution of 0.75 g (4.2 mmole) of 4-methoxy-2H-1,4-benzoxazin-3(4H)-one in 10 ml of carbon tetrachloride (dried over molecular sieve) was added 0.75 g (4.2 mmole) of N-bromosuccinamide and a few crystals of dibenzoyl peroxide. After heating for 1 hr, a white precipitate of succinamide formed. The reaction mixture was cooled down to room temperature and placed in the refrigerator overnight. The solid was removed by filtration and solvent evaporated off in vacuo. The residue, a semi-solid, was recrystallized from petroleum ether to give the above-named product, mp 80°–83°.

EXAMPLE 2

Preparation of 2,4-Dimethoxy-2H-1,4-benzoxazin-3(4H)-one

Addition of 100 mg of 2-bromo-4-methoxy-2H-1,4-benzoxazin-3-(4H)-one to a stirred solution of 100 mg of $AgNO_3$ in absolute methanol caused an immediate precipitation of AgBr. The reaction mixture was filtered and the filtrate diluted with water and extracted with ether 3 times. The combined organic extract yielded colorless crystals of the above-named product, mp 54°–56°.

EXAMPLE 3

Preparation of Ethyl α-bromo-α-methoxyacetate

The procedure of Carpino [*J. O. C.*, 29, 2820 (1964)] for the preparation of t-butyl-α-alkoxy-α-bromo-acetate was followed here. The above-named product distilled at 45°–47°/1.0 mm.

EXAMPLE 4

Preparation of Methyl α-bromo-α-methoxyacetate

Following the procedures set forth in Example 3 above, the methyl ester was prepared, bp 83°–85°/16 mm.

EXAMPLE 5

Preparation of Ethyl α-methoxy-α-(o-nitrophenoxy)acetate

To a stirred solution of 19.4 g. (0.14 mole) of o-nitrophenol in 400 ml. of anhydrous ether was added dropwise 35 g. (0.14 mole) of thallous ethoxide. After vigorous stirring for 10 min. the solvent was removed via a filtering stick, and the red-orange salt was washed twice with dried benzene. Fresh benzene (400 ml.) was then added to the reaction flask, followed by the addition of 27.5 g. (014 mole) of ethyl α-bromo-α-methoxyacetate at such a rate that the reaction temperature did not exceed 30°. A thallium bromide mirror formed on the walls of the flask as the reaction proceeded. When all the reagent was added, the mixture was stirred for an additional 45 min. and then filtered through Celite. The filtrate upon distillation yielded the above-named product, b.p. 145°–147°/0.5 mm.

EXAMPLE 6

Preparation of Methyl α-methoxy-α-(o-nitrophenoxy)acetate

The potassium o-nitrophenate was formed from 48 g. (0.44 mole) of potassium t-butoxide, 56 g. (0.40 mole) of nitrophenol in 300 ml. of dry benzene. To this red salt suspended in benzene was added 80 g. (0.44 mole) of methyl α-bromo-α-methoxyacetate. Stirring was continued for 1 hr. and the solution turned a light brown color. After working up as described in Example 5, the reaction yielded the above-named product, b.p. 139°–141°/0.35 mm., m.p. 46°–47°.

EXAMPLE 7

Preparation of Zinc 4-hydroxy-2-methoxy-2H-1,4-benzoxazin-3(4H)-onate

To a solution of 90 g (0.374 mole) of methyl α-methoxy-α-(n-nitrophenoxy)acetate in 3 l. of ethanol was added a solution of 90 g of ammonia chloride in 600 ml of water. Some precipitate formed at this point. Zinc dust, 90 g, was added in small portions under vigorous stirring, and care was taken not to allow the temperature to rise above 40°. The stirring was continued for 4 hr after the addition was completed. The precipitate was removed by filtration through Celite. The filtrate was concentrated down to half the volume in vacuo, and yielded the above named zinc salt, mp 200°–260°. An analytical sample was obtained by crystallization from tetrahydrofuran-pentane, mp 270°.

EXAMPLE 8

Preparation of 4-Hydroxy-2-methoxy-2H-1,4-benzoxazin-3(4H)-one

Zinc 4-hydroxy-2-methoxy-2H-1,4-benzoxazin-3(4H)-one, 5.5 g (12 mmole) was dissolved in 200 ml of tetrahydrofuran (slightly cloudy) and stirred with 26 g of Dowex 50W ($H^+$) resin for 1 hr. The resin was removed by filtration and solvent evaporated off in vacuum. The residue of reddish crystals, was dissolved in ether, treated with charcoal, and diluted with pentane to yield the abovenamed product as off-white crystals, mp 138°–139°.

EXAMPLE 9

Preparation of 2,4-Dihydroxy-2H-1,4-benzoxazin-3(4H)-one

4-Hydroxy-2-methoxy-2H-1,4-benzoxazin-3(4H)-one, 10.5 g (54 mmole), was dissolved in 500 ml of methylene chloride under a nitrogen atmosphere. To this solution kept in an ice bath was added 12 ml (16.20 g, 140 mmole) of boron trichloride (collected into a dropping funnel using a Dry-ice condenser) dropwise over a period of 4 min. After stirring for 3 hr at ice-bath temperature, nitrogen was passed through the reaction mixture to flush out the solvent and excess boron trichloride. A white fluffy precipitate formed; this solid was dissolved in 100 ml of tetrahydrofuran, and added to a stirred slurry of 33 g (120 mmole) of silver carbonate in 150 g of ice-water. The foaming subsided after 30 min, and the mixture was filtered through a layer of Celite. The filtrate was extracted with ether until the aqueous layer showed very faint hydroxamic acid test (ferric chloride). The combined ether extracts were washed twice with a little saturated sodium chloride solution, dried over sodium sulfate and the solvent evaporated to give 9 g of solid. The solid was dissolved in ether, treated with charcoal and the ether solution diluted with pentane to yield the above-named product in crystalline form, mp 163.5°–165°. The mother liquor gave two more crops of product, mp 162°–163° and mp 156°–158°.

EXAMPLE 10

Preparation of 2,4-Dimethoxy-2H-1,4-benzoxazin-3(4H)-one

A mixture of 9.0 g of zinc 4-hydroxy-2-methoxy-2H-1,4-benzoxazin-3(4H)-one, 90 ml of dimethoxyethane, 36 g of methyl iodide, and 5.5 g of hexamethylphosphoramide was heated for 24 hr under a nitrogen atmosphere. At the end of this time, a tlc analysis indicated the reaction was essentially complete. The reaction mixture was diluted with ice-water and extracted with methylene chloride 3 times. The organic portion was washed with 2N hydrochloric acid, then with a 5% sodium bicarbonate solution, dried (sodium sulfate) and the solvent removed to give 7 g of residue. The residue after passing through a column of Grade III aluminum oxide (eluted with ether), yielded 4.0 g of solid which after crystallization from ether-pentane gave the above-named product, mp 55°–57°.

EXAMPLE 11

Preparation of Copper 4-hydroxy-2-methoxy-2H-1,4-benzoxazin-3(4H)-onate

The copper salt was prepared by mixing 3.5 g of 4-hydroxy-2-methoxy-2H-1,4-benzoxazin-3(4H)-one (in 20 ml of methanol) with 2 g of cupric acetate (in 40 ml of water). The desired end product was collected as a green precipitate, mp 235°. A sample recrystallized from methanol-water had mp 255°.

EXAMPLE 12

Preparation of 4-Hydroxy-2-methoxy-2H-1,4-benzoxazin-3(4H)-one

The procedure of Coutts [*J. Pharm. Pharmacol.*, 16, 773 (1964)] was employed here in the reduction of 1.3 g of the nitro ester methyl α-methoxy-α-(o-nitrophenoxy)acetate. After workup, there was isolated the desired product, slightly impure, mp 121°–123°.

EXAMPLE 13

Preparation of Methyl α-methoxy-α-(3-methoxy-6-nitrophenoxy) acetate

The above-named compound was prepared following the procedure employed in Example 6 from 3-methoxy-6-nitrophenol, after recrystallization from methylene chloride-ether, mp 81°–82°.

EXAMPLE 14

Preparation of Zinc 4-hydroxy-2,7-dimethoxy-2H-1,4-benzoxazin-3(4H)-onate

Following the procedure in Example 7, the above-named compound was obtained from methyl α-methoxy-α-(3-methoxy-6-nitrophenoxy) acetate, mp 258°–259° (tetrahydrofuran-pentane).

EXAMPLE 15

Preparation of 4-Hydroxy-2,7-dimethoxy-2H-1,4-benzoxazin-3(4H)-one

Following the procedure in Example 8, the above-named compound was prepared from zinc 4-hydroxy-2,7-dimethoxy-2H-1,4-benzoxazin-3(4H)-onate, mp 148°–150° (ether-pentane).

EXAMPLE 16

Preparation of 2,4-Dihydroxy-7-methoxy-2H-1,4-benzoxazin-3(4H)-one

Following the procedures in Example 9 (except lowering the reaction temperature to −78°), the above-named compound was obtained from 4-hydroxy-2,7-dimethoxy-2H-1,4-benzoxazin-3(4H)-one, mp 179°–180° (acetone-hexane).

EXAMPLE 17

Preparation of 2,4,7-Trimethoxy-2H-1,4-benzoxazin-3(4H)-one

Following the procedure set forth in Example 10, the above-named compound was obtained from zinc 4-hydroxy-2,7-dimethoxy-2H-1,4-benzoxazin-3(4H)-onate, mp 66°–68° (ether-pentane).

EXAMPLE 18

Preparation of Copper 4-hydroxy-2,7-dimethoxy-2H-1,4-benzoxazin-3(4H)-onate

Following the procedure set forth in Example 11, the above-named compound was obtained from 4-hydroxy-2,7-dimethoxy-2H-1,4-benzoxazin-3(4H)-one, mp 241°–242°.

EXAMPLE 19

Preparation of 3-Chloro-6-nitrophenol

A solution of 100 g (0.54 mole) of 3-chloro-6-nitroanisole in 700 ml of 48% hydrobromic acid was heated to reflux overnight. The solution was cooled, and nitrogen passed through to blow out most of the hydrobromic acid. The methylene chloride extract of the reaction mixture, after washing with water and drying over sodium sulfate, yielded the above-named product, mp 36°–38°.

EXAMPLE 20

Preparation of Methyl α-(3-chloro-6-nitrophenoxy)α-α-methoxyacetate

Following the procedure set forth in Example 6, the above-named compound was prepared from 3-chloro-6-nitrophenol, mp 53°–55° (methanol).

EXAMPLE 21

Preparation of Zinc 7-chloro-4-hydroxy-2-methoxy-2H-1,4-benzoxazin-3(4H)-onate

Following the procedure set forth in Example 7, the above-named compound was obtained from methyl α-(3-chloro-6-nitrophenoxy)-α-methoxyacetate, mp 266°–267°.

EXAMPLE 22

Preparation of 7-Chloro-4-hydroxy-2-methoxy-2H-1,4-benzoxazin-3(4H)-one

Following the procedure set forth in Example 8, the above-named compound was obtained from zinc 7-chloro-4-hydroxy-2-methoxy-2H-1,4-benzoxazin-3(4H)-onate, mp 165°–168° (methylene chloridepentane).

EXAMPLE 23

Preparation of 7-Chloro-2,4-dimethoxy-2H-1,4-benzoxazin-3(4H)-one

Following the procedure set forth in Example 10, the above-named product was prepared from zinc 7-chloro-4-hydroxy-2-methoxy-2H-1,4-benzoxazin-3(4H)-onate, mp 123°–125° (ether-pentane).

EXAMPLE 24

Preparation of 2-Hydroxy-4-methoxy-2H-1,4-benzoxazin-3(4H)-one

A mixture of 325 mg (1.26 mmole) of 2-bromo-4-methoxy-2H-1,4-benzoxazin-3(4H)-one, 360 mg (1.3 mmole) of silver carbonate and 20 ml of wet ether was stirred for an hour at room temperature. The reaction mixture was filtered and the filtrate concentrated to dryness. The residue was recryatallized from ether/petroleum ether to yield the above-named product, mp 131.5°–133.0°.

EXAMPLE 25

Preparation of 2-[2-hydroxy-4-methoxy-(2H)-1,4-benzoxazin-3(4H-one]-2,3,4,6-tetraaceto-β-D-glucoside 250 mg. (1 mmole) of 2-bromo-4-methoxy-2H-1,4-benzoxazin-3(4H)-one was added to a mixture of 348 mg. (1 mmole) of a β-D-glucose-2,3,4,6-tetraacetate and 276 mg. (1 mmole) of silver carbonate in 15 ml. of methylene chloride. After stirring overnight at room temperature, the reaction mixture was filtered, and chromatographed on silica gel to yield the above-named product as a glassy solid.

We claim:

1. A compound of the formula

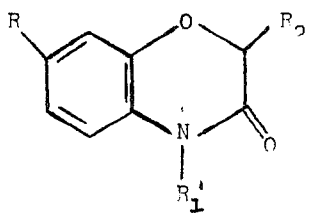

wherein R is selected from the group consisting of hydrogen, halogen, lower alkyl, phenyl and tolyl; $R_1'$ signifies hydroxy, lower alkoxy or benzyloxy; $R_2'$ signifies hydroxy, lower alkoxy or an acetyl protected glucoside group, with the proviso that if R signifies hydrogen, at least one of $R_1'$ and $R_2'$ is other than hydroxy and, when $R_1'$ is hydroxy, the salts thereof with transition metals.

2. A compound of claim 1 wherein R signifies halogen.

3. The compound of claim 2 wherein $R_1'$ is hydroxy, $R_2'$ is methoxy and the halogen group is chlorine, i.e., a compound of the formula 7-chloro-4-hydroxy-2-methoxy-2H-b 1,4-benzoxazin-3(4H)-one.

4. The compound of claim 2 wherein $R_1'$ and $R_2'$ are methoxy and the halogen group is chlorine, i.e., a compound of the formula 7-chloro-2,4-dimethoxy-2H-1,4-benzoxazin-3(4H)-one.

5. A compound of claim 1 wherein R signifies hydrogen.

6. The compound of claim 5 wherein $R_1'$ and $R_2'$ signify methoxy, i.e., a compound of the formula 2,4-dimethoxy-2H-1,4-benzoxazin-3(4H)-one.

7. The compound of claim 5 wherein $R_1'$ is methoxy and $R_2'$ is a tetraaceto-protected glucoside, i.e., a compound of the formula 2-[2-hydroxy-4-methoxy-(2H)-1,4-benzoxazin-3(4H)-one]-2,3,4,6-tetraaceto-β-D-glucoside.

8. The compound of claim 5 wherein $R_1'$ signifies hydroxy and $R_2'$ signifies methoxy, i.e., a compound of the formula 4-hydroxy-2-methoxy-2H-1,4-benzoxazin-3(4H)-one.

9. The compound of claim 1 wherein $R_1'$ and $R_2'$ are methoxy and the lower alkoxy group is methoxy, i.e., a compound of the formula 2,4,7-trimethoxy-2H-1,4-benzoxazin-3(4H)-one.

10. The compound of claim 1 of the formula zinc 4-hydroxy-2-methoxy-2H-1,4-benzoxazin-3(4H)-onate.

11. The compound of claim 1 of the formula copper 4-hydroxy-2-methoxy-2H-1,4-benzoxazin-3(4H)-onate.

12. A compound of the formula

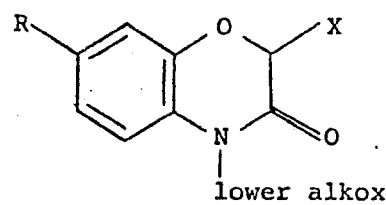

wherein R is selected from the group consisting of hydrogen, halogen, lower alkoxy, lower alkyl and phenyl and talyl; and X signifies chlorine or bromine.

* * * * *